United States Patent [19]

Shahriar

[11] Patent Number: 5,501,244

[45] Date of Patent: Mar. 26, 1996

[54] VALVE ASSEMBLY

[75] Inventor: Niakan Shahriar, Sherman Oaks, Calif.

[73] Assignee: Emhart Inc., Newark, Del.

[21] Appl. No.: 338,869

[22] Filed: Nov. 14, 1994

[51] Int. Cl.⁶ ................................................. G05D 11/03
[52] U.S. Cl. ...................................... 137/98; 137/625.41
[58] Field of Search ........................ 137/98, 100, 625.41

[56] References Cited

U.S. PATENT DOCUMENTS

| | | |
|---|---|---|
| 2,704,650 | 7/1948 | Rand . |
| 3,048,274 | 8/1962 | Lundeen . |
| 3,688,790 | 9/1972 | Esten ................................ 137/98 |
| 3,724,480 | 4/1973 | Povalski et al. ..................... 137/98 |
| 3,807,426 | 4/1974 | Henes ................................ 137/100 |
| 3,921,659 | 11/1975 | Rudewick, III ..................... 137/98 |
| 4,094,333 | 6/1978 | Petursson . |
| 4,095,610 | 6/1978 | Priesmeyer ......................... 137/100 |
| 4,130,136 | 12/1978 | Garnier et al. . |
| 4,226,260 | 10/1980 | Schmitt . |
| 4,241,749 | 12/1980 | Petursson .......................... 137/100 |
| 4,243,063 | 1/1981 | Parkison . |
| 4,362,186 | 12/1982 | Parkison et al. . |
| 4,397,330 | 8/1983 | Hayman . |
| 4,425,935 | 1/1984 | Gonzalez . |
| 4,700,928 | 10/1987 | Marty . |
| 4,901,750 | 2/1990 | Nicklas et al. . |
| 4,905,732 | 3/1990 | Bright et al. . |
| 4,915,295 | 4/1990 | Pullen et al. . |
| 4,971,112 | 11/1990 | Knapp . |
| 5,040,566 | 8/1991 | Orlandi . |
| 5,067,513 | 11/1991 | Nicklas et al. . |
| 5,129,576 | 7/1992 | Pullen et al. . |
| 5,297,322 | 3/1994 | Kraus . |
| 5,299,593 | 4/1994 | Ottelli . |

OTHER PUBLICATIONS

Powers Process Controls, Hydroguard® Series 400, p. 2, Feb. 1976.
Specifying Engineer, "How to Control Hot Water Temperature Supplies" (FIG. 4B), Apr. 1984.

Primary Examiner—Robert G. Nilson
Attorney, Agent, or Firm—J. Bruce Hoofnagle

[57] ABSTRACT

A valve assembly 30 includes a pressure balancer 38 and a water mixing control element 150. Hot and cold water flow through pressure balancer 38 and a throttle plate 200 and into a mixing chamber 144 where selected amounts of the hot and cold water are mixed to a temperature level selected by a user. If the pressure of the cold water changes, the pressure balancer 38 responds and adjusts the amount of hot water flowing to the mixing chamber 144 to maintain the temperature of the mixed water as initially selected. If the cold water pressure fails, pressure balancer 38 responds and turns off the hot water to prevent scalding the user. Pressure balancer 38 responds in similar fashion to changes or failure in the pressure of the hot water.

24 Claims, 9 Drawing Sheets

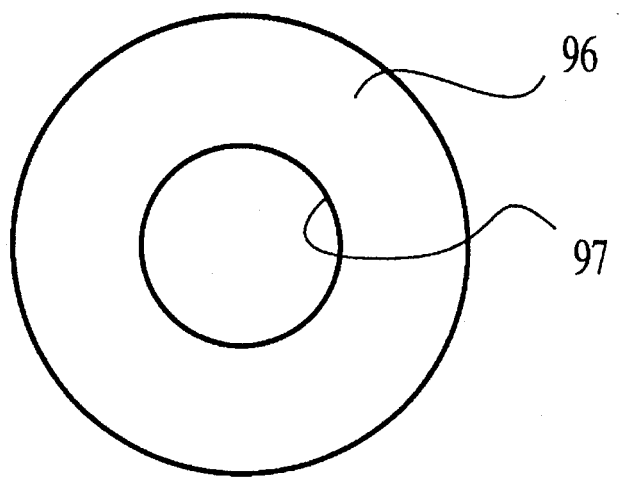
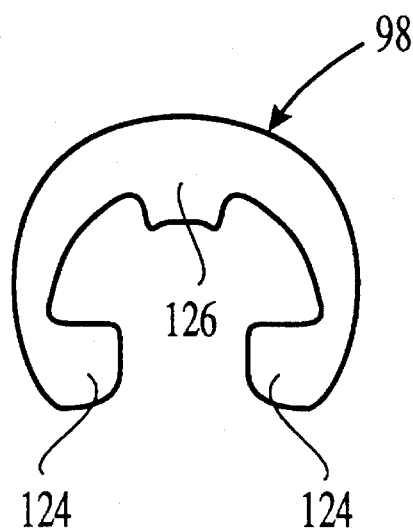
Fig. 10               Fig. 11
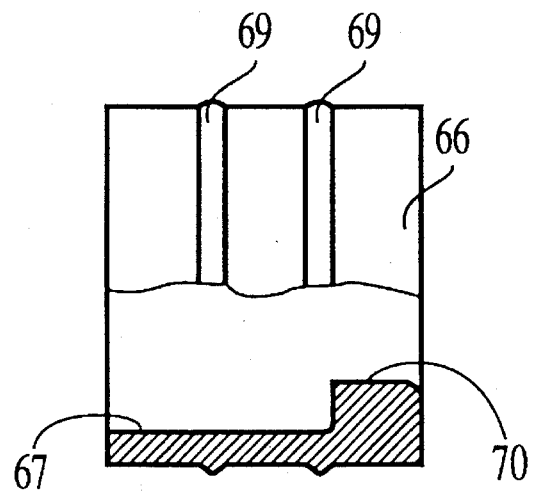
Fig. 12

VALVE ASSEMBLY

BACKGROUND OF THE INVENTION

This invention relates to a valve assembly and relates particularly to a valve assembly having an anti-scald pressure balancer. This invention also relates particularly to a valve assembly having a mixing valve for selectively establishing the mix of hot and cold water passing through the valve assembly.

For some years, a pressure balancer is used in a hot/cold water supply system where hot water is supplied through a pressurized facility separately from the pressurized facility which supplies the cold water. This type of system is usually used in large facilities such as hotels, apartment and condominium complexes, gymnasiums, college dormitories and the like. In such large facilities, large numbers of people may be bathing simultaneously, for example by shower, and thereby placing simultaneous hot and cold water demands on the supply of such facilities. In order to insure that sufficient hot water is available for immediate demand, a hot water supply, separate from the cold water supply, is established and is pressurized independently of the cold water supply. Thus, when demands are made by the users of the system, hot and cold water is available immediately.

When water is demanded by a user for showering, the user adjusts the mixing valve to attain a desired temperature of the mixed hot and cold water. If, during the course of showering, the cold water pressure fails or drops significantly, the user is then subjected instantaneously and unexpectedly to the hot water which is operating under the separate pressurizing system. This could result in serious scalding of the user. In addition, if the hot water pressure fails or drops significantly, the user is subjected instantaneously and unexpectedly to the cold water which, while not as potentially harmful to the user's well being as failure of the hot water pressure, could be startling and extremely unpleasant.

In the past, in order to prevent the unexpected reaction to the failure of either the hot water pressure or the cold water pressure in such independently pressurized systems, a pressure balancer has been used to effectively shut off the supply of either hot or cold water upon failure of the pressurized supply of the other.

The pressure balancer also responds to changes in the pressure of the hot and cold water supplies where such changes do not constitute a failure of the pressure but do represent sufficient pressure change to alter the mix of the hot and cold water. In such conditions, the temperature of the mixed hot and cold water, as detected by the user, changes noticeably and, at times, unpleasantly. The pressure balancer responds to such pressure changes by balancing or equalizing the pressure on the hot water side and the cold water side of the balancer which tends to restore the hot and cold water mix level established prior to the above-noted change in the initial pressure level.

In recent years, many States have instituted code provisions which require the installation of such pressure balancers in new residential homes even though residential homes typically do not have separate hot and cold water pressure systems. Nonetheless, this action has added another layer of significance in the utilization of pressure balancers. Within the next several years, it is expected that all States will have such requirements.

Typically, a pressure balancer includes a poppet unit having two poppets where each is formed with hard closure surfaces with one poppet located in a hot water flow path and the other poppet located in a cold water flow path. The flow paths are separated by a diaphragm to which the poppet unit is connected. The diaphragm, which separates the two flow paths, is responsive to changes in the pressure of the hot and cold water passing through the paths and moves the poppet unit and poppets accordingly. When the hot and cold water pressures are equal, the system is balanced and the diaphragm is in a neutral position. When the cold water pressure decreases or fails, the diaphragm moves toward the cold water flow path and pulls or moves the poppets accordingly. As the poppets move, the hard closure surface of the poppet in the hot water flow path moves closer to or into engagement with a hard fixed surface to effectively control flow of the hot water upon a decrease in the cold water pressure or to effectively seal the hot water flow path upon failure of the cold water pressure and thereby prevent scalding of the user of the related shower. The pressure balancer operates in a similar fashion when the hot water pressure decreases or fails and thereby controls the cold water flow or shuts off the cold water accordingly.

While the above-described pressure balancer functions theoretically as described, the practical success of such a pressure balancer is dependent to some extent upon the flow controlling structure of the surfaces, and to another extent upon the sealing ability of the hard closure surfaces of the poppets and the respective hard fixed surfaces. If the integrity of these mating surfaces is poor and they do not seat properly, for example due to poor construction or wear, the sealing ability of the pressure balancer is less than effective and the user of the shower may still be subjected to scalding or to the sudden shock of cold water.

Various organizations which set standards for the operation of plumbing products have recognized the serious consequences of defective performance of pressure balancers and have set standards for minimum allowable leakage during a shut off mode. While new pressure balancers may function in accordance with the standards at the outset, there could be a tendency for failures to occur after some period of use due to wear.

It is important that a pressure balancer be capable of controlling water flow during the pressure changes noted above. Without such control, the diaphragm may not be responsive and thereby fail to react as required. This failure of control typically occurs when the effective opening between the moving hard closure surface of the poppet and the hard fixed surface remains essentially unchanged due to the geometry of the two surfaces. The unchanging opening does not allow the development of increased resistance in the flow path which would normally result from the continuing closure of the opening. This results in no pressure change at the surface of the diaphragm which ceases to move the poppet whereby the pressure balancer fails to perform effectively.

Thus, it is important to provide a pressure balancer which allows for full and continued response to changes in water pressure in order to effectively control the continued balancing performance of the pressure balancer.

In addition to the problems noted above, when a failure occurs in the hot or cold pressurized water systems, a pulsating reaction occurs wherein the hard closure surface repeatedly engages the hard fixed surface. This results in a loud chattering noise which is offensive noise pollution. Further, such repeated engagement tends to wear the sealing surfaces thereby hastening the problems noted above with regard to the integrity of the seal attainable by the pressure balancer.

Thus, there is a need for a valve assembly having a long-life pressure balancer with high integrity which effectively seals the hot and cold water flow paths on demand and which does so with no noticeable noise pollution.

The sensitivity and responsiveness of pressure balancers which use a diaphragm is directly related to the effective area of the diaphragm which is subjected to the pressure changes of the hot and cold water. In past attempts to expand this sensitivity reaction, water from other portions of the flow paths has been directed into chambers behind the end of each poppet which results in the water pressure being applied against the ends of the poppets. In this manner, the effective responsive area to water pressure change has been increased by the area of the ends of the poppets. However, to preclude the leakage of such chambered water along the sides of the poppets and into the flow paths adjacent the poppets, additional sealing means such as compliant O-rings had to be assembled about the periphery of each of the poppets and within cylindrical wells in which the poppets are contained and move. Eventual wear of the O-rings, due to the frictional engagement of the moving O-rings with the walls of wells, could result in the leakage along the sides of the poppets as noted above. This would then decrease the effectiveness of the chambered water pressure on the poppets. In addition, the presence of the O-rings introduced an additional drag in the responsive performance of the pressure balancer. Under such conditions, the pressure balancer had to overcome the resistance of the moving frictional engagement of the O-rings with the well walls in order to perform as required.

Thus, there is a need for a valve assembly having a pressure balancer which is capable of utilizing, long term, the principle of water pressure on the poppet ends to enhance the area responsive to water pressure changes without the negative trade-off of O-ring friction.

Since the poppet includes the hard closure surfaces, the distance of travel of the poppet to engage the hard fixed surfaces, in response to pressure failure of the respective water supplies, becomes critical during the operation of the pressure balancer. Thus, the dimensioning and the tolerancing of the poppet during the manufacture thereof also is extremely critical. Currently, poppet units are composed of several axially aligned pieces which are assembled by various means of securance to provide a unitary product. In the design of the multiple piece poppet, each piece is designed with a dedicated tolerance limit in the axial direction. When the pieces are assembled in an axial configuration to form the poppet unit, the tolerances of all of the pieces are cumulative in the axial direction. Thus, while the piece of the poppet unit which includes one of the hard closing surfaces is made with an acceptable tolerance for locating the surface a desired normal distance from the hard fixed surface, the cumulative effect of assembly of that piece with the other pieces of the poppet may place the closing surface an undesirable "normal" distance from the fixed surface.

Consequently, there is a need for a poppet structure which essentially eliminates concern for the cumulative effect of multiple tolerances.

In current valve assemblies, hot and cold water is passed through the water flow paths, through water seals and through selectively shaped holes in a selectively positionable mixing valve and into a mixing chamber to attain a mixture of the hot and cold water. The mixing valve typically includes a plastic throttling member having a disc-like base with the selectively shaped holes formed therethrough. A stem is formed on the base and extends axially therefrom. A stainless steel plate is formed with the selectively shaped holes and with tabs which extend axially from the side of the plate. The plate is assembled with the base by inserting the tabs into receptacles of the plastic base whereby the integrity of the plastic walls of the receptacles is disturbed. Eventually, if the plate has to be removed and replaced, the wall of the plastic receptacle is so disrupted that the tabs will no longer be retainable with the receptacles.

Thus, there is a need for a valve assembly having facility for assembling the tabs of the stainless steel throttle plate with the receptacles of the plastic base with the ability to remove the tabs therefrom without repeated disruption of the plastic walls of the receptacles.

In the formation of the stem of the plastic throttling member, it would be desirable to form various reliefs during the plastic curing stage to reduce the undesirable effects typically experienced in the curing of thick plastic parts. However, where the appearance of such reliefs is similar to receptacles for other parts which are to be assembled with the stem, assemblers could mistakenly assemble the other parts in the reliefs. This could result in defective operation of the valve assembly.

Thus, there a need for a valve assembly having a plastic stem with reliefs to facilitate the manufacture of the plastic stem while insuring that other parts are not assembled in the reliefs.

SUMMARY OF THE INVENTION

In view of the foregoing needs, it is an object of this invention to provide a valve assembly having a pressure balancer which is capable of effectively and repeatedly sealing water flow paths in response to changes in pressure of the water being supplied thereto.

Still another object of this invention is to provide a valve assembly having a pressure balancer with prescribed structure in hot and cold water flow paths thereof to insure that, in response to pressure changes in hot and cold water supplies, the pressure balancer provides continuous effective control of the water flow therethrough in order to sustain effective operation of the pressure balancer during a period of pressure change.

It is another object of this invention to provide a valve assembly having a pressure balancer which is capable of operating in an substantially noise-free manner.

An additional object of this invention is to provide a valve assembly having a pressure balancer which enhances the effective area of pressure-change responsiveness of the balancer in the sealing water flow paths.

A still further object of this invention is to provide a valve assembly having a pressure balancer with a poppet structured with a tolerance discipline which allows a closing surface of the poppet to be spaced an acceptable normal distance from a fixed surface of the balancer.

It is a further object of this invention to provide a valve assembly having a plastic throttling element which can be repeatedly assembled and disassembled with a metal member without major disruption of the plastic surface of the throttling element.

Another object of this invention is to provide a valve assembly having a plastic throttling element formed with facility to preclude mistaken assembly by an installer of other parts with the throttling element.

With these and other objects in mind, this invention contemplates a valve assembly which includes a pressure balancer having a housing formed with a chamber and a poppet mounted for movement within the chamber. A diaphragm is mounted on the poppet and separates the chamber into two sections which define a first fluid flow path and a second fluid flow path therethrough. A closure surface is located in the first fluid path adjacent the poppet. A compliant element is mounted on the poppet for movement therewith and is spaced normally from the closure surface. Upon failure of the pressure of a fluid in the second fluid flow path, the diaphragm moves toward the second fluid flow path and thereby moves the poppet so that the compliant element moves into compliant engagement with the closure surface to seal the first fluid flow path.

Other objects, features and advantages of the present invention will become more fully apparent from the following detailed description of the preferred embodiment, the appended claims and the accompanying drawings

BRIEF DESCRIPTION OF THE DRAWINGS

In the accompanying drawings:

FIG. 10 is a front view of a plate which forms a portion of the poppet assembly of FIG. 7;

FIG. 11 is a front view of an E-ring which forms a portion of the poppet assembly of FIG. 7;

FIG. 12 is a side view with portions in section showing a seal used in the valve assembly of FIG. 1;

DETAILED DESCRIPTION OF THE PREFERRED EMBODIMENT

Figure 1:
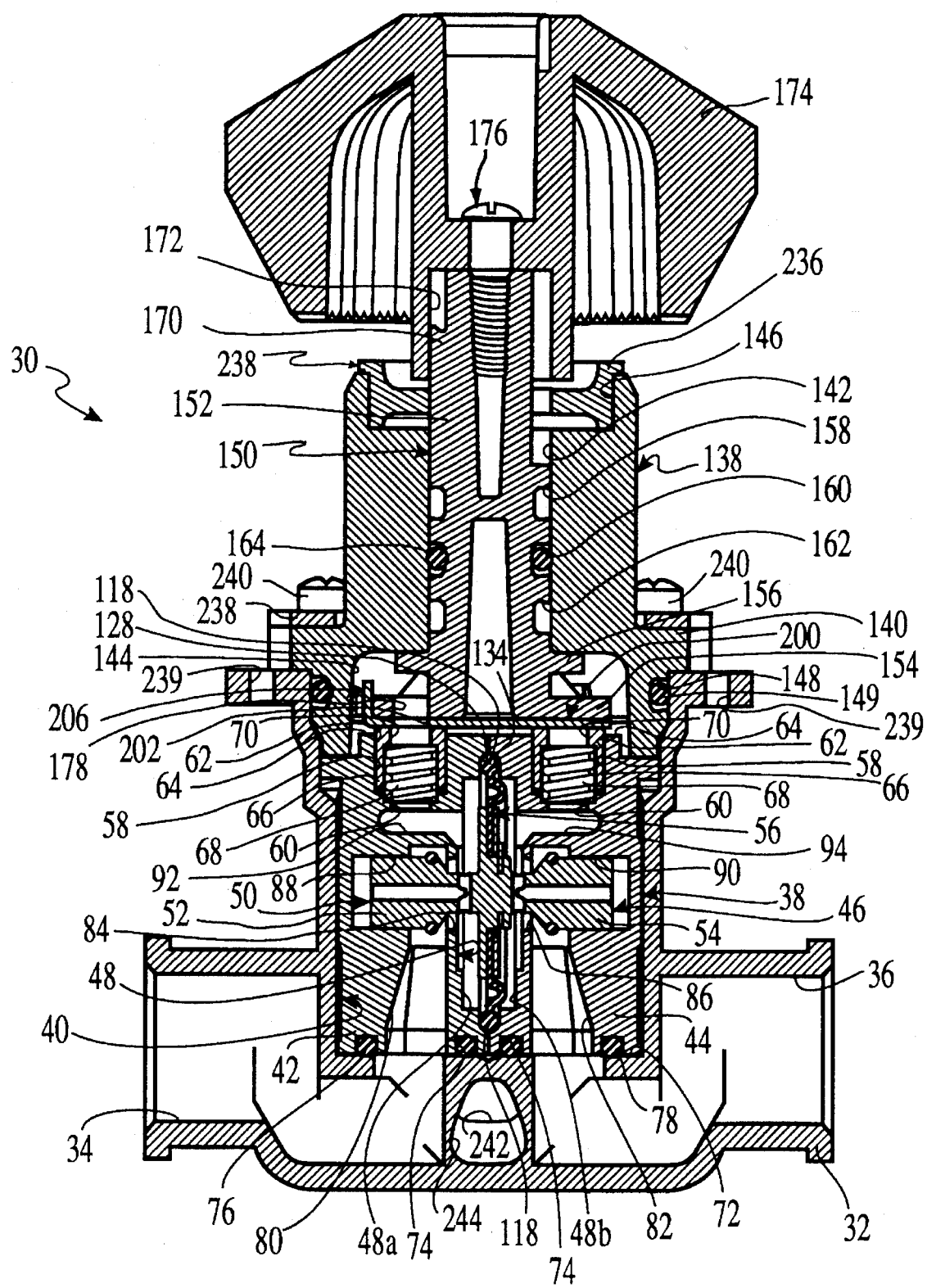
FIG. 1 is a sectional of a valve assembly showing a pressure balancer and a mixing valve in accordance with certain principles of the invention.

Referring to FIG. 1, a valve assembly 30 includes a valve housing 32 composed of brass. Housing 32 is formed with a hot water inlet 34 and a cold water inlet 36. Hot water is supplied to valve assembly 30 through inlet 34 from a pressurized system (not shown) which is independent of a pressurized system (not shown) from which the cold water is supplied to the valve assembly through inlet 36. In another pressurized water supply system (not shown), both the hot and cold water are supplied through the same pressurized system without departing from the spirit and scope of the invention.

Figure 2:
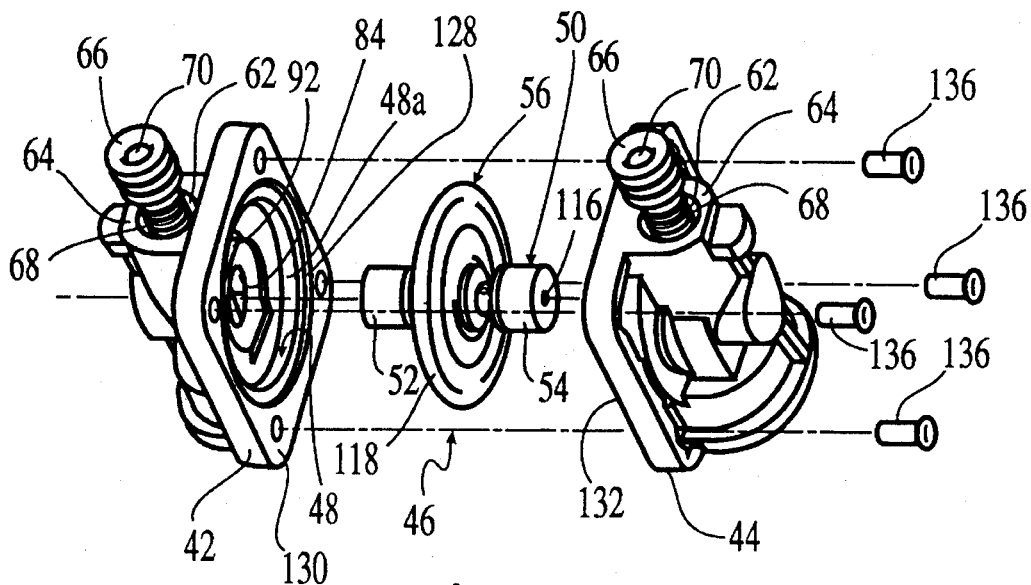
FIG. 2 is a perspective view of certain elements of the pressure balancer of FIG. 1.
Figure 3:
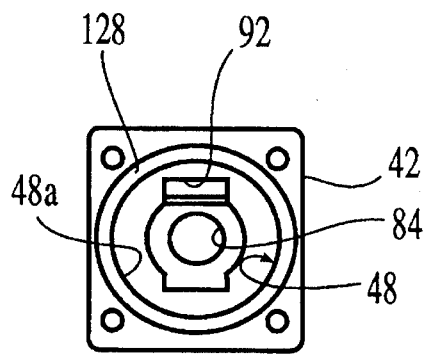
FIG. 3 is an inside view of a portion of a housing of the pressure balancer of FIG. 1.
Figure 4:
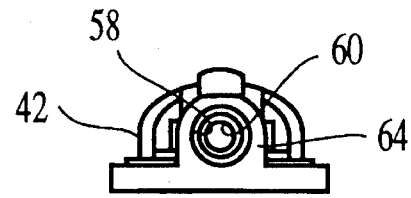
FIG. 4 is a top view of the housing portion of FIG. 3.
Figure 5:
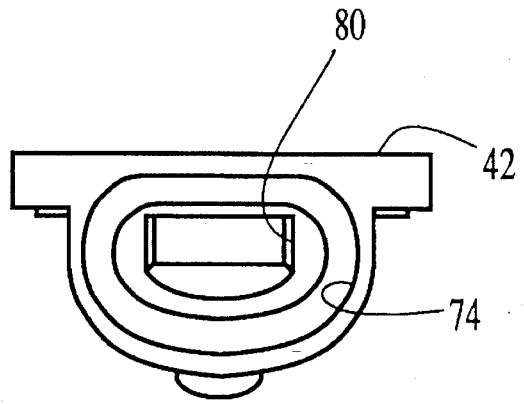
FIG. 5 is a bottom view of the housing portion of FIG. 3.

A pressure balancer 38 is located within a chamber 40 formed in housing 32 and is formed by a pair of identically shaped plastic sections 42 and 44 which are illustrated further in FIG. 2. The details of section 42, which is identical to section 44, are illustrated in FIGS. 3, 4 and 5.

A poppet assembly 46 is located within a chamber 48 of pressure balancer 38 formed by the assembly of sections 42 and 44. Poppet assembly 46 includes a one-piece brass poppet unit 50 which is more clearly viewed in FIGS. 6 and 7 and which is formed with a pair of poppets 52 and 54 at opposite axial ends thereof. Poppet assembly 46 also includes a flexible diaphragm 56 (FIGS. 8 and 9) composed of a material such as, for example, rubber and is located centrally, and laterally of the axis, on the poppet assembly.

Figure 6:
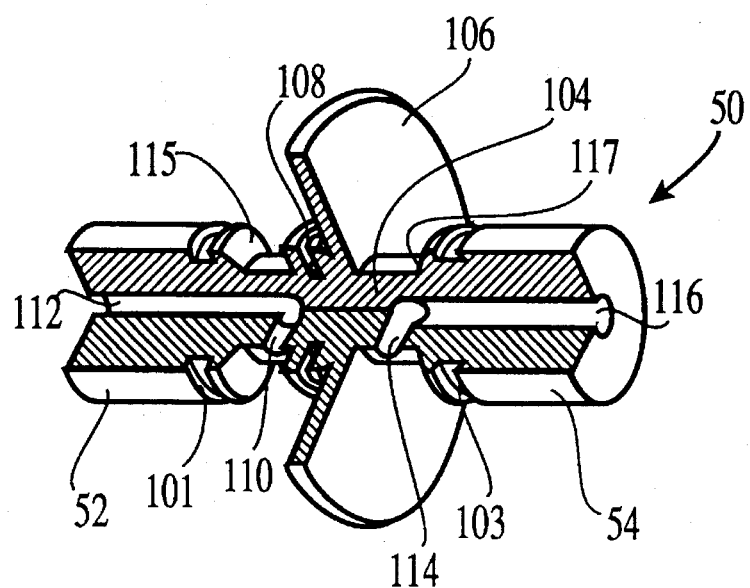
FIG. 6 is a perspective view of a poppet assembly in accordance with certain principles of the invention.
Figure 7:
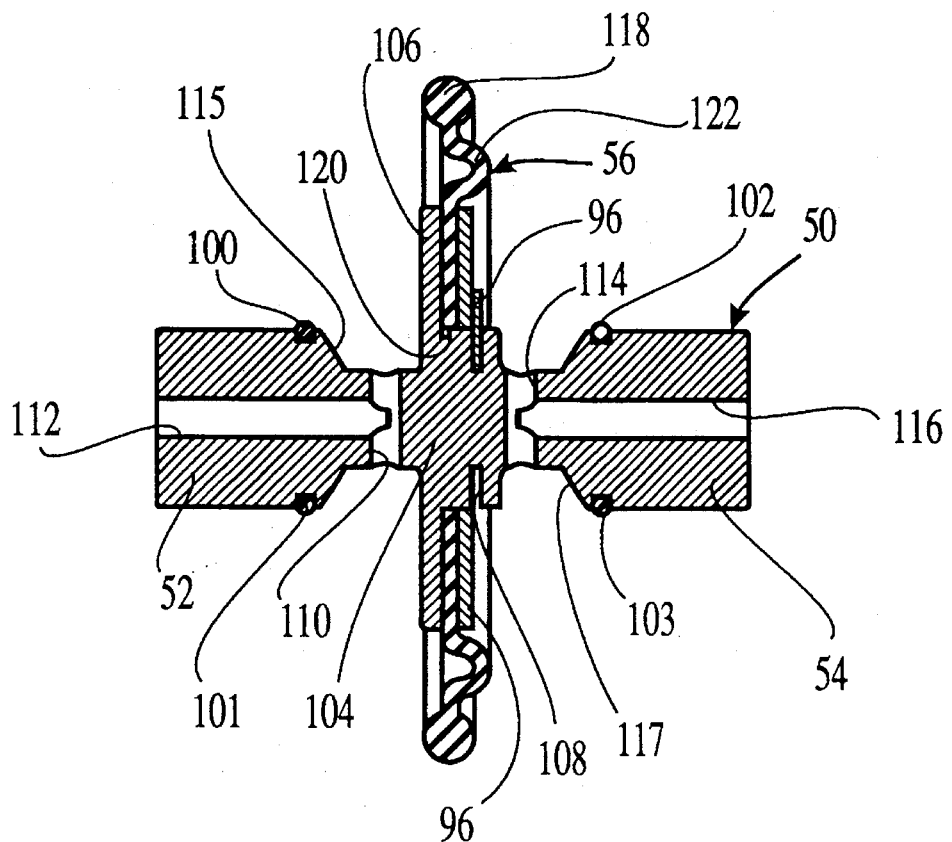
FIG. 7 is a side view of the poppet assembly of FIG. 6.

As viewed in FIG. 7, poppet assembly 46 includes the singlepiece poppet unit 50, diaphragm 56, a metal diaphragm plate 96 (FIG. 10) formed with an axial opening 97, an E-ring 98 (FIG. 11), an O-ring 100 mounted in a groove 101 formed on poppet 52 and an O-ring 102 mounted in a groove 103 formed on poppet 54. As shown in FIGS. 6 and 7, poppet unit 50 further includes a central hub 104 with poppets 52 and 54 extending axially in opposite directions therefrom. A disc-shaped support plate 106 is formed radially with and from hub 104 and an annular groove 108 is formed in the hub at a location axially spaced from the support plate. A passage 110 is formed transaxially through hub 104 adjacent poppet 52 and communicates with a passage 112 formed axially in poppet 52. A passage 114 is formed transaxially through hub 104 adjacent poppet 54 and communicates with a passage 116 formed axially in poppet 54. A bevelled surface 115 is formed at the inboard end of poppet 52 at the transition with hub 104. Another bevelled surface 117 is formed at the inboard end of poppet 54 at the transition with hub 104. Hub 104 is formed with an external diameter which is less that the external diameter of poppets 52 and 54. Bevelled transition surface 115 extends between the smaller-diameter hub 104 and the larger-diameter poppet 52 at one end of the hub while bevelled transition surface 117 extends between the opposite end of the smaller-diameter hub and the larger diameter poppet 54.

Figure 9:
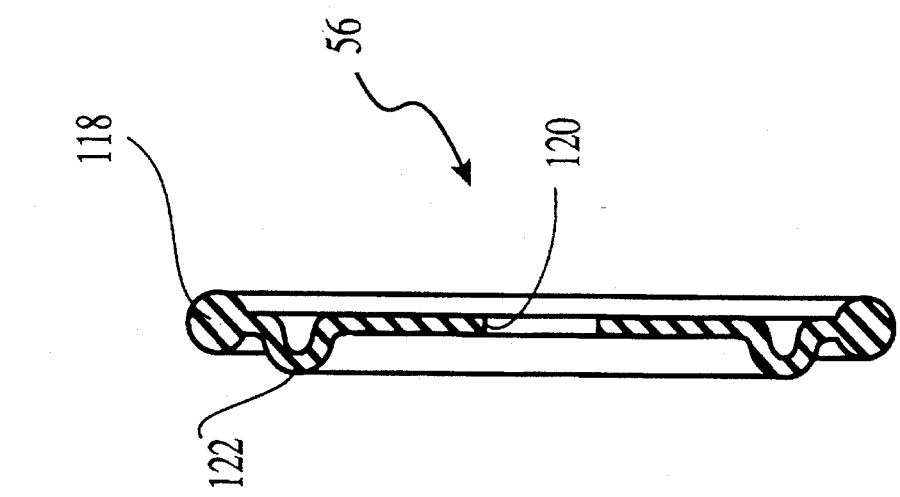
FIG. 9 is a sectional view taken along line 9—9 of FIG. 8 showing certain features of the diaphragm of FIG. 8.
Figure 8:
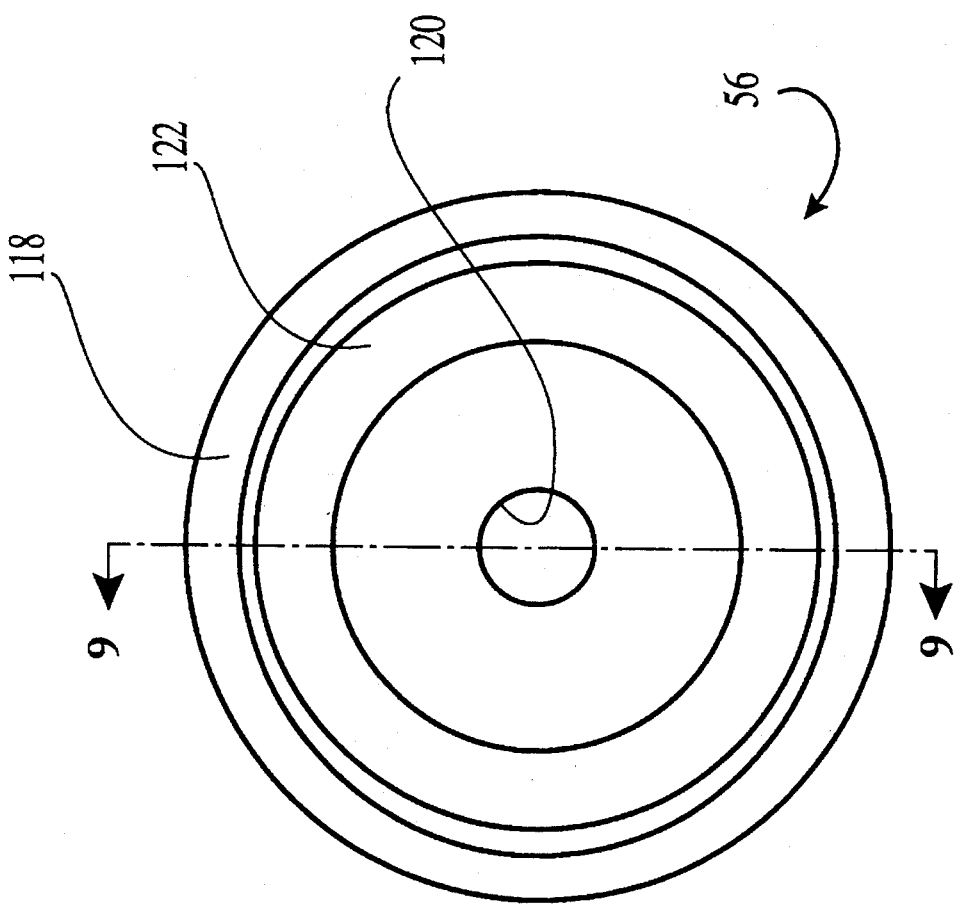
FIG. 8 is a front view of a diaphragm of the poppet assembly of FIG. 7.

As shown in FIGS. 7, 8 and 9, diaphragm 56 is formed with an annular circular rim 118, an axial opening 120 and an arcuate annular rib 122 which is concentric with and intermediate of the rim and opening. As shown in FIG. 11, E-ring 98 is formed with a pair of resiliently-separable spaced arms 124 and a center tab 126.

In assembling the components of poppet assembly 46 as illustrated in FIG. 7, opening 120 of diaphragm 56 is placed over hub 104 and one side of the diaphragm is positioned against support plate 106. Thereafter, opening 97 of plate 96 is placed over hub 104 and the plate is positioned against the other side of diaphragm 56. E-ring 98 is located in groove 108 to retain plate 96 in place against diaphragm 56 to thereby retain the diaphragm in place. O-rings 100 and 102 are then placed in poppet grooves 101 and 103, respectively, to complete the assembly of components of poppet assembly 46.

Each of sections 42 and 44 is formed with a seal well 58 which communicates with chamber 48 through a port 60 and which, as shown in FIGS. 1 and 2, extends through an outer port 62 formed in an upper surface 64 of each section. As shown in FIGS. 1 and 12, a cup-like rubber seal 66 is located in each of the wells 58 (FIG. 1) and is formed with an opening 67. Seal 66 is normally urged outwardly through port 62 (FIG. 1) by a spring 68 which is located in opening 67. Each of the seals 66 is formed with a port 70 through a base of the seal and a pair of spaced annular ribs 69 on the periphery of the seal.

Referring to FIG. 1, pressure balancer 38 is nested within chamber 40 of housing 32 and rests on a ledge 72 formed in the base of the chamber. Each of the sections 42 and 44 of pressure balancer 38 is formed with a groove 74 (FIG. 5) which receives and supports a pair of O-rings 76 and 78, respectively, to seal the water passages adjacent thereto.

Referring further to FIG. 1, sections 42 and 44 of pressure balancer 38 are formed with a water inlet passages 80 (FIG. 5) and 82, respectively, which communicate with a pair of restrictor openings 84 (FIGS. 2 and 3) and 86, respectively. Passages 80 and 82 also communicate with a pair of cylindrical wells 88 and 90, respectively, which are also formed in sections 42 and 44, respectively, and which are located to receive rearward portions of poppets 52 and 54, respectively. Restrictor openings 84 and 86 communicate with chamber passages 48*a* (FIGS. 2 and 3) and 48*b*, respectively, which are formed by the division of chamber 48 due to the presence of diaphragm 56. Chamber passages 48*a* and 48*b* communicate with passages 92 (FIGS. 2 and 3) and 94 formed in sections 42 and 44, respectively, which, in turn, communicate with ports 60 and seal ports 70.

Figure 16:
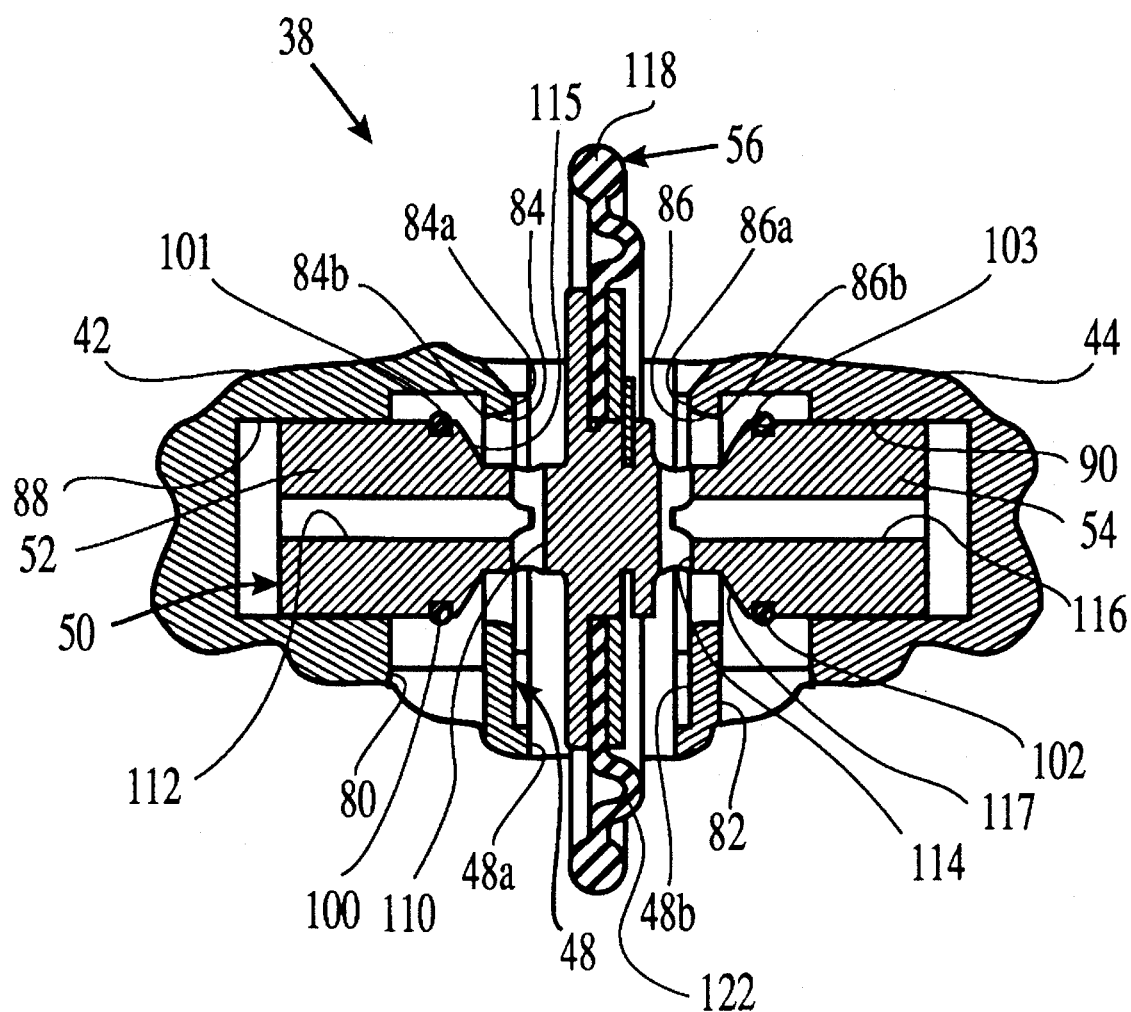
FIG. 16 is a partial view of the pressure balancer of FIG. 1 showing the balancer in a neutral mode.
Figure 17:
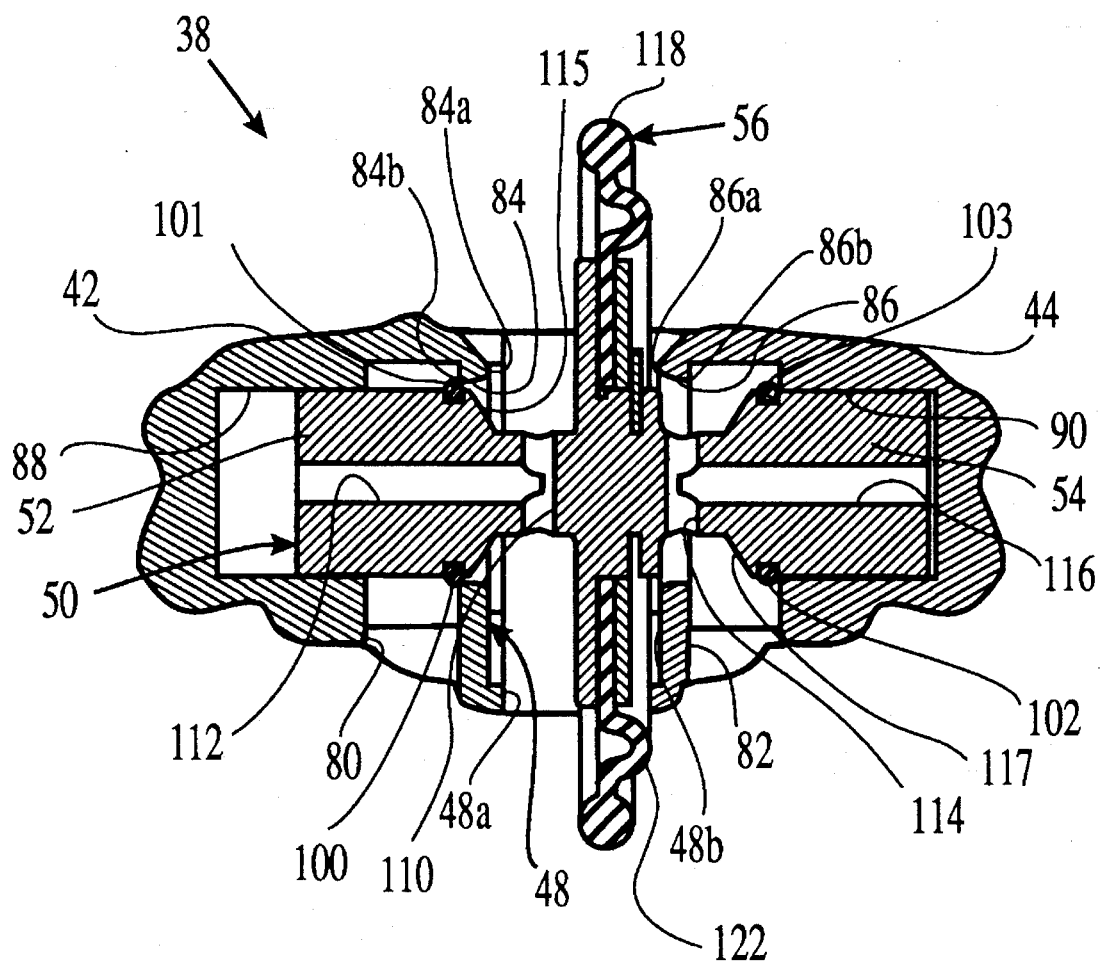
FIG. 17 is a partial view of the pressure balancer of FIG. 1 showing the balancer in a cold-water-failure mode in accordance with certain principles of the invention.
Figure 18:
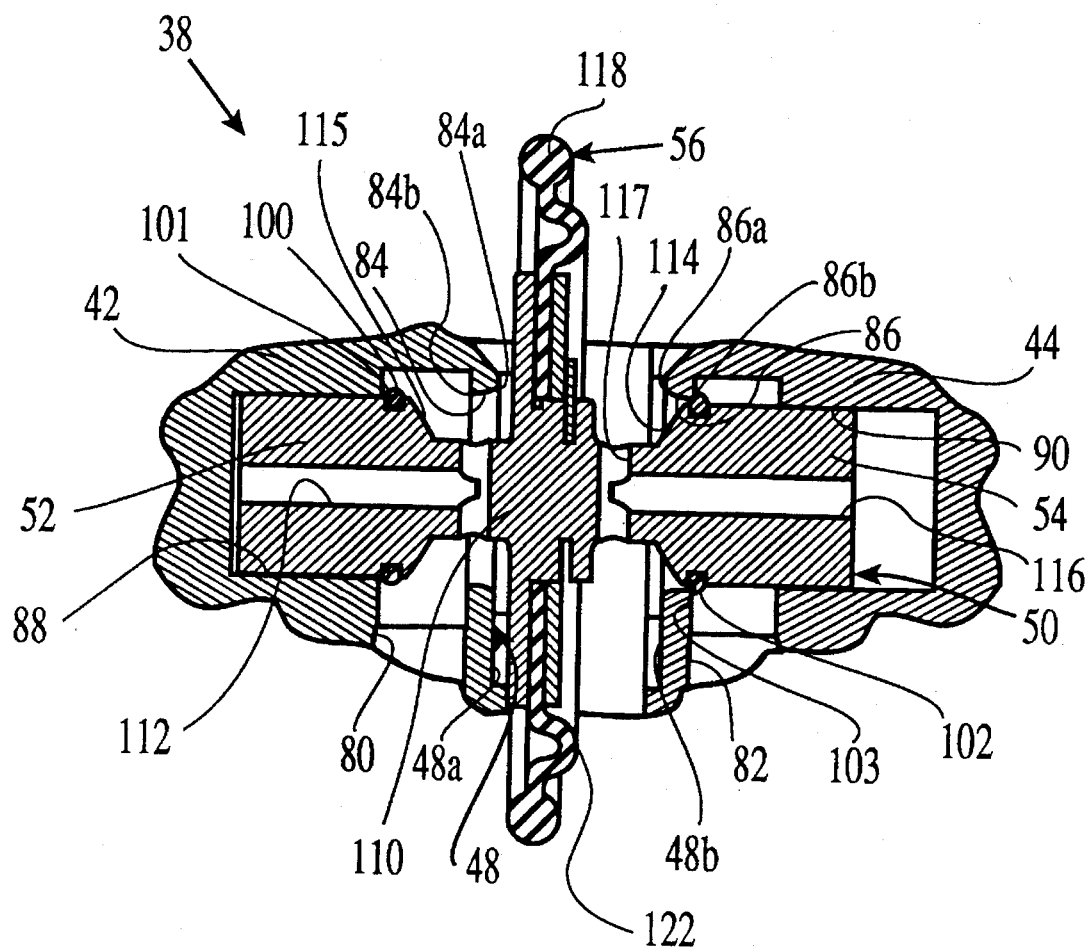
FIG. 18 is a partial view of the pressure balancer of FIG. 1 showing the balancer in a hot-water-failure mode in accordance with certain principles of the invention.

As viewed in FIGS. 16, 17 and 18 restrictor opening 84 is formed with a rounded corner 84*a* at the side of the opening closest to diaphragm 56 and a sharp corner 84*b* at the side of the opening closest to cylindrical well 88. Restrictor opening 86 is also formed with a rounded corner 86*a* and a sharp corner 86*b* in like manner. Further, restrictor openings 84 and 86, and cylindrical wells 88 and 90, are each formed with a diameter which is slightly larger than the diameter of poppets 52 and 54 sufficient to allow the poppets to be moved through the restrictor openings and into the wells. The closeness of the size of the diameters allows movement of the poppets 52 and 54 while essentially precluding the flow of water between the poppets and openings 84 and 86, respectively, and wells 88 and 90, respectively.

In assembling the components of pressure balancer 38, preassembled poppet assembly 46 is positioned so that poppet 52 is aligned with restrictor opening 84 of balancer section 42 which has not yet been assembled with section 44. Poppet 52 is then moved through opening 84 and into well 88. As poppet 52 is moved through opening 84, O-ring 100, which extends radially beyond the diameter of the opening, initially engages rounded corner 84*a* of the opening to gradually compress the O-ring and thereby allow the poppet and O-ring to pass through the opening. After poppet 52 and O-ring 100 have been moved beyond opening 84, when the poppet is moved in the reverse direction during operation of pressure balancer 38, bevelled surface 115 and the full-diameter portion of the poppet on the diaphragm side of the O-ring move into the opening. However, even though rounded corner 84*a* facilitated movement of O-ring 100 through opening 84, sharp corner 84*b* precludes movement of the O-ring through the opening and the O-ring compresses to effectively seal the opening.

As poppet 52 is moved into cylindrical well 88, rim 118 of diaphragm 56 is moved into sealing engagement with a rounded radially-outboard corner 128 (FIGS. 1, 2 and 3) of chamber 48. Restrictor opening 86 of section 44 is aligned with poppet 54 and then moved over the poppet. Rounded corner 86*a* of opening 86 allows O-ring 102 to compress gradually and pass through opening 86. Eventually, poppet 54 is located in cylindrical well 90 and a face 130 (FIG. 2) of section 42 engages a face 132 (FIG. 2) of section 44. As faces 130 and 132 are moved into interfacing engagement, a rounded radially-outboard corner 134 (FIG. 1) of chamber 48 of section 44 moves into sealing engagement with rim 118 of diaphragm 56. Rim 118 is thereby compressed between rounded corners 128 and 134 to seal and segregate chamber sections 48*a* and 48*b* from each other and preclude the flow of water from one chamber section to the other. Four rivets 136 (FIG. 2) are then moved through aligned holes (not shown) in sections 42 and 44 and are headed to retain the sections together. Springs 68 are assembled into openings 67 of seals 66 and the springs and seals are inserted into seal wells 58 with seal ports 70 extending outwardly from the wells as shown in FIG. 1 to thereby complete the assembly of pressure balancer 38.

The flow path through pressure balancer 38 for hot water entering housing inlet 34 includes passage 80, restrictor opening 84, passage 48*a*, passage 92, port 60, seal opening 67 and seal port 70. The flow path through pressure balancer 38 for cold water entering housing inlet 36 includes passage 82, restrictor opening 86, passage 48*b*, passage 94, port 60, seal opening 67 and seal port 70.

Referring again to FIG. 1, a plastic bonnet 138 is formed with a flange 140, an axial opening 142 and a chamber 144 at one end which communicates with the opening. A recess 146 is formed at the other end of bonnet 138. Further, bonnet 136 is formed with an annular groove 148 on the outer periphery thereof adjacent flange 140 for eventual receipt of a water sealing 0-ring 149.

Figure 13:
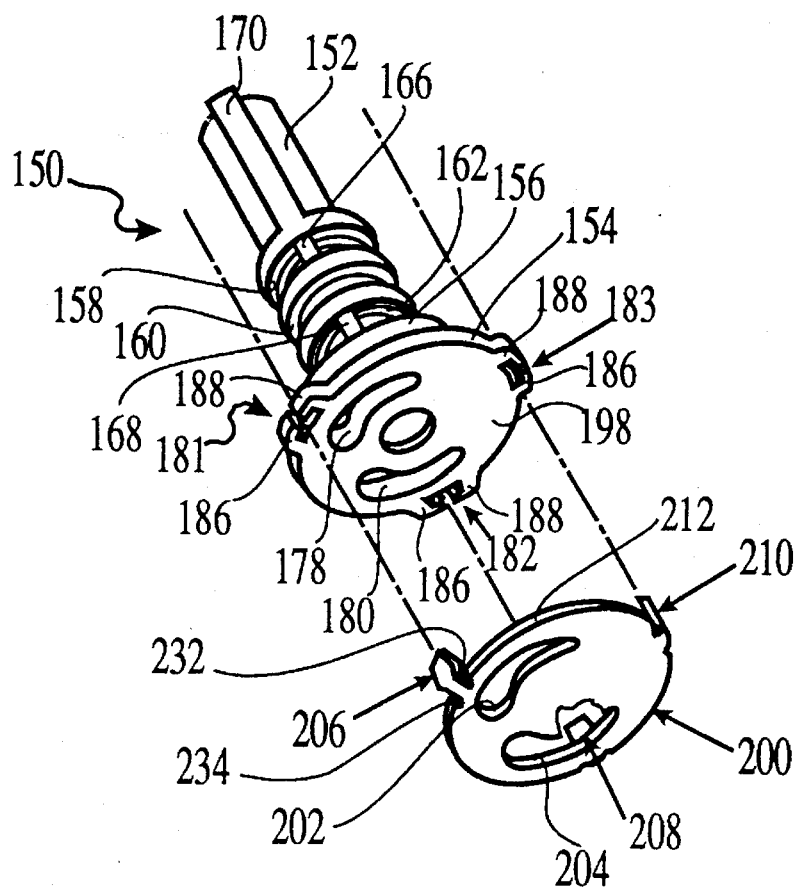
FIG. 13 is an exploded view of a plastic base with stem and a throttle plate of the mixing valve of FIG. 1 in accordance with certain principles of the invention.

Referring to FIGS. 1 and 13, a plastic water-mixing control element 150 is formed with a stem 152 and a disc-like base 154. Element 150 is also formed with a flange 156 slightly spaced inboard from base 154. Three spaced annular grooves 158, 160 and 162 are formed in the periphery of stem 152. The axially outboard grooves 158 and 162 are formed to facilitate enhancement of the formational integrity of stem 152 during curing of the plastic in the manufacture of element 150. Intermediate groove 160 is formed for eventual receipt of an O-ring 164 (FIG. 1). To insure that O-ring 164 is not mistakenly assembled in either of grooves 158 and 162, axially aligned ribs 166 and 168 (FIG. 13), respectively, are formed in the grooves. An installer thereby will be precluded from mistakenly installing O-ring 164 in either of grooves 158 and 162.

Referring further to FIG. 13, a key 170 is formed in an axial direction on stem 152 and projects radially therefrom. As viewed in FIG. 1, key 170 fits into a keyway 172 formed in a control knob 174 which is positioned on the top of stem 152 and which is secured there by a screw 176.

Figure 14:
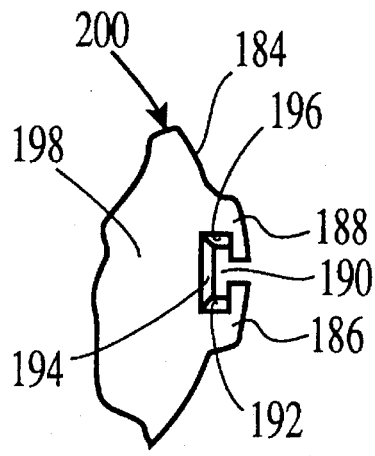
FIG. 14 is a partial bottom view of a receptacle formed on the plastic base of FIG. 13 in accordance with certain principles of the invention.

As viewed in FIG. 13, base 154 is formed with a pair of generally tear-shaped through holes 178 and 180. Three equally-spaced, radially-extending receptacles 181, 182 and 183 are formed on and extend radially from a periphery 184 of base 154. As shown in FIG. 14, receptacle 181 is formed by a pair of spaced arms 186 and 188 located at a normal spacing but which can be spread apart resiliently with the tendency to return to the normal spacing when released. Arms 186 and 188 extend sufficiently from periphery 184 to form a space 190 therebetween. Walls 192, 194 and 196 of space 190 are tapered inwardly from a bottom surface 198 (FIGS. 13 and 14) of base 154 to the other side of the base. Receptacles 182 and 183 are formed in like manner to receptacle 181.

Figure 15:
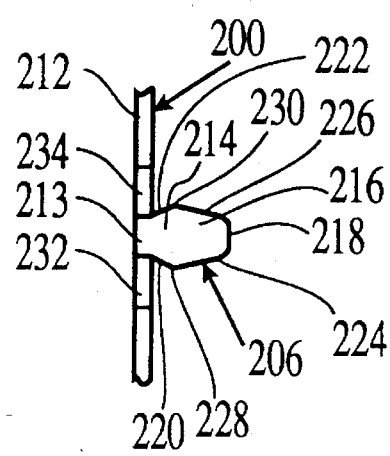
FIG. 15 is a partial side view of the throttle plate of FIG. 13 showing a tab formed on the plate in accordance with certain principles of the invention.

Referring to FIGS. 13 and 15, a stainless steel throttle plate 200 is formed in a disc-like configuration essentially the same as base 154 of control element 150. Plate 200 is formed with a pair of generally tear-shaped through holes 202 and 204 which align with holes 178 and 180, respectively, when the plate is assembled with bottom surface 198 of base 154. Three spaced tabs 206, 208 and 210 are formed on a periphery 212 of plate 200 and each tab is bent toward base 154 at a right angle to the plane of the disc-like plate. Each of tabs 206, 208 and 210 are configured as shown in FIG. 15 with respect to tab 206.

As viewed in FIG. 15, tab 206 is formed with a neck 213 which is integrally formed with periphery 212 at one end thereof and with an inboard body section 214 of the tab at an opposite end thereof. Tab 206 is formed with an outboard body section 216 which is joined integrally with an inboard body section 214 at one portion thereof and is formed with a free end 218 at the opposite portion thereof. Sides 220 and 222 of inboard section 214 taper outwardly from neck 213 while sides 224 and 226 of outboard section 216 taper inwardly from the juncture of the inboard and outboard sections to the free end 218. Due to the outwardly and inwardly tapering sides 220 and 224, respectively, a defined edge 228 is formed at the juncture of the tapering sides. In like fashion, a defined edge 230 is formed at the juncture of tapering sides 222 and 226. Portions 232 and 233 of periphery 212 on each side of neck 213 are cut away toward the center of plate 200 to provide stress relief for those areas of the plate when tabs 206, 208 and 210 are bent to the position illustrated in FIGS. 13 and 15.

When plate 200 is to be assembled with base 154, plate 200 is placed in spaced interfacing alignment with base surface 198 with tabs 206, 208 and 210 aligned with receptacles 181, 182 and 183 respectively. Plate 200 is then moved toward base surface 198 whereby the free ends 218 and outboard section 216 of tabs 206, 208 and 210 glide into openings 190 of the receptacles. Due to the tapering walls 192, 194 and 196 of openings 190, and the tapering sides 224 and 226 of tabs 206, 208 and 210, the tabs are guided some distance into the receptacles before the sides engage and begin to move arms 186 and 188 apart. Eventually, edges 228 and 230 engage walls 192 and 196, respectively, and, upon continued movement, bite or dig into the walls. As edges 228 and 230 move further into openings 190, the edges tend to dig further into the walls. However, while some degree of digging occurs, the resiliency of arms 186 and 188 tends to relieve the tendency of the edges 228 and 230 from digging significantly into walls 192 and 196, respectively. In any event, the degree of digging that does occur, facilitates the retention of plate 200 with base 154. If, for any reason, it is desired to remove plate 200 from assembly with base 154, arms 186 and 188 of receptacles 181, 182 and 183 can be spread slightly apart and tabs 206, 208 and 210, respectively, backed out of openings 190. The resiliency, then, allows the withdrawal of edges 228 and 230 from openings 190 without further disruption of the integrity of the surfaces of walls 192 and 196. This precludes the necessity of replacing control element 150 because integrity of the wall surfaces would otherwise have been disturbed beyond further use absent the resilient Separation of arms 186 and 188.

A disc 236 of an adjustable temperature limit stop facility 238 is located in recess 146 of bonnet 138. Facility 238 allows for the adjustable positioning of a stop (not shown) which establishes the limit of travel of stem 170 and knob 174 in the hot water direction.

Bonnet 138, with mixing element 150 assembled therewith, is positioned within the top opening of housing 32 and rests on the top of pressure balancer 38 and a ledge of the housing as illustrated in FIG. 1. Thereafter, a ring plate 238 is positioned over the upper portion of bonnet 138 and is positioned on top of bonnet flange 140 in such a fashion that holes (not shown) formed in the plate are aligned with holes (not shown) formed in the bonnet and threaded holes 239 formed in housing 32. Screws 240 are then inserted into the aligned holes and are threadedly secured to the threaded holes in housing 32 to capture pressure balancer 38 within the housing and to secure bonnet 138 with the housing. At the same time, mixing element 150 is captured in its assembly with bonnet 138. Also, O-ring 149 seals the top opening of housing 32 as illustrated in FIG. 1.

As bonnet 138 is assembled on top of pressure balancer 38, the underside of throttle plate 200 engages the upwardly extending upper surfaces of seals 66 which are biased firmly against the throttle plate by springs 68. With this assembly, the hot water flow path for water flowing from the hot water seal port 70, includes the tear shaped holes 202 and 178 of throttle plate 200 and base 154, respectively, and mixing chamber 144. In similar fashion, the cold water flow path for water flowing from the cold water seal port 70 includes tear shaped holes 204 and 180 (FIG. 13) of throttle plate 200 and base 154, respectively, and mixing chamber 144.

The user of valve assembly 30 can adjust the mixture of hot and cold water in mixing chamber 144 by turning knob 174 which, in turn, rotates throttle plate 200 with respect to stationary seals 66. This rotation moves various portions of the tear shaped holes 202 and 204 over ports 70 of the respective seals 66 to adjust the volume of hot and cold water which is allowed to flow into mixing chamber 144 and thereby establish a water temperature suitable for the user. When the user wishes to stop the water flow, knob 174 is rotated to move solid portions of throttle plate 200 over ports 70 of seals 66 to seal the ports and close the flow paths for the hot and cold water.

The mixed hot and cold water, which is mixed in chamber 144, will the flow through passages (not shown) formed between housing 32 and pressure balancer 38 and will exit the housing either through a shower head outlet 242 or a spout outlet 244 as selected by the user.

Under conditions where the hot and cold water pressures from the respective hot and cold water supplies are equal, the elements of pressure balancer 38 will assume a neutral position as shown in FIG. 16 wherein the pressure on the hot water side of diaphragm 56 is equal to the pressure on the cold water side of the diaphragm. With diaphragm 56 being in the neutral position, poppets 52 and 54 are equally spaced from the respective restrictor openings 84 and 86 whereby the flow paths for the hot and cold water through pressure balancer 38 are equally sized.

If, for example, there is a decrease in the pressure of the cold water supply, the cold water pressure acting on the respective of side of diaphragm 56 will decrease thereby creating a pressure inbalance on opposite sides of the diaphragm. Since the cold water pressure has decreased, the greater hot water pressure will exert a force on the respective side of diaphragm 56 whereby the diaphragm moves to the right of the position shown in FIG. 16. As diaphragm 56 moves to the right, or toward the cold water side thereof, poppet 52 is moved to the right whereby bevelled transition surface 115 and O-ring 100 move closer to restrictor opening 84 to restrict further the opening. At the same time, poppet 54 moves to the right of the position illustrated in FIG. 16 to open restrictor opening 86 further. As a result of this responsive action by pressure balancer 38, the volume of hot and cold water flowing into mixing chamber 144 (FIG. 1) is essentially the same as it was before the decrease in the cold water pressure. In this manner, the temperature of the mixed water being sensed by the user remains essentially the same and the user does not experience any unpleasant, and potentially injurious, consequences even though there has been a decrease in cold water pressure.

A decrease in the pressure of the hot water will cause a comparable reaction by pressure balancer 38 where diaphragm 56 and poppets 52 and 54 move to the left from the position illustrated in FIG. 16. This provides a comparable response and maintains the mixed water at essentially the same temperature as it was before the decrease in the hot water pressure.

If the cold water pressure fails completely, there is essentially no cold water being supplied to mixing chamber 144 (FIG. 1). If hot water continues to be supplied to the mixing chamber 144, and thereby to the user, the user could be scalded. However, upon failure of the cold water pressure, diaphragm 56 moves to the right to the position illustrated in FIG. 17 where O-ring 100 engages and is compressed against sharp corner 84b of restrictive opening 84 to effectively close or seal the opening. This action shuts off the supply of hot water to mixing chamber 144 and to outlet 242 or 244 (FIG. 1) being used by the user thereby preventing the possible scalding of the user.

In similar fashion, when the hot water pressure fails, diaphragm 56 responds to the pressure differential and shifts poppet unit 50 to the left as viewed in FIG. 18. O-ring 102 effectively closes and seals restrictor opening 86 to preclude continued supply of cold water upon failure of the supply of hot water whereby the user is spared from the sudden shock of being subjected to the cold water only.

It is noted that, when O-ring 100 of poppet 52 moves to the position as shown in FIG. 17 to close restrictor opening 84, the O-ring prevents further movement of the poppet unit 50 to the right. Dimensionally, groove 103 of poppet 54 is located to preclude the engagement of O-ring 102 with the adjacent wall of section 44 at the entry port of well 90. This dimensioning allows O-ring 100 to fully perform the closure of restrictor opening 84 and to stop movement of poppet unit 50 without concern for O-ring 102 first engaging the adjacent wall of section 44 and preventing the full and effective performance of O-ring 100. Further; the axial length of poppet 54 is selected to insure that the poppet will not engage the end wall of well 90 at any time during the operation and use of pressure balancer 38. This also insures that O-ring 100 engages sharp corner 84b to close restrictor opening when called upon to do so. Further, if any pulsations occur in the movement of poppet unit 50 during the process, and continuance, of closure of restractor opening 84, the end surface of poppet 54 is precluded from engaging the end wall of well 90. This precludes any chattering noise which otherwise may have occurred had poppet 54 been as long as, or longer than, the axial depth of the well 90.

In similar fashion, poppet 52 is dimensioned so that O-ring 100 never engages section 42 and the poppet never engages the end wall of well 88 for the same reasons expressed above with respect to poppet 54 and O-ring 102.

In the past, the poppet was formed with a hard closure surface which engaged the mating hard surface of the associated restrictor opening to close the opening. When pulsations occurred in the related poppet unit, a chattering noise would occur due to the constant repetitive engagement of the hard surfaces with each other. This also resulted in repetitive opening and closing of the restrictive opening during a period when the opening was supposed to be closed. While standards set by plumbing industry associations and others allowed a minimal leakage, it would be desirable to limit such leakage even further.

O-ring 100 is assembled in groove 101 of poppet 52 to effectively and firmly compress against sharp corner 84b of restrictor opening 84 to close the opening. If pulsations occur, O-ring 100 may relax to some extent during such pulsations but does not relax sufficiently to allow the O-ring to disengage from sharp corner 84b whereby the O-ring is sustained in a compressed state sufficient to maintain closure of restrictor opening 84. Further, due to the soft surface of O-ring 100 in engagement with the hard surface of sharp corner 84b of opening 84 during closure of restrictor opening 84, there is no noticeable chattering during pulsations of poppet unit 50.

In similar fashion, during pulsations of poppet unit 50, O-ring 102 facilitates the continued closure of restrictor opening 86 and provides engaging surfaces which do not produce any noticeable chattering.

Referring to FIG. 16, during the initial flow of hot water through pressure balancer 38, passages 110 and 112 of poppet 52 and the open space between the end face of the poppet and the end wall of well 88, will fill with hot water. As the hot water continues to flow through pressure balancer 38, the pressure of the hot water is effectively sensed by the end face of poppet 52 due to the water path which includes passages 110 and 112 and the open space between the end face of the poppet and the end wall of well 88. In similar fashion, passages 114 and 116 of poppet 54, and the open space between the poppet and the end wall of well 90, will fill with cold water and the pressure of the cold water will be sensed by the end face of the poppet. The sensing of the hot water pressure and the cold water pressure by poppets 52 and 54, respectively, in this manner effectively adds to the pressure-sensing surface provided by diaphragm 56 and enhances the performance of pressure balancer 38.

If the cold water fails, diaphragm 56 must move responsively and continuously to the right from the neutral position illustrated in FIG. 16 until restrictor opening 84 is closed by O-ring 100. During this period, the open space formed by restrictor opening 84 should be decreasing progressively such that the pressure of the water at the surface of diaphragm 56 is continuously changing thereby causing and allowing the diaphragm to continue to deflect and to continue the closure movement of poppet unit 50. Initially, the continued movement of bevelled transition surface 115 into restrictive opening 84 provides the progressive closing of the opening necessary to achieve the continuous pressure change at the surface of diaphragm 56.

Due to the geometry of restrictor opening 84 and bevelled surface 115, as intermediate portions of the bevelled surface located between the radially inboard end and the radially outboard end of the bevelled surface approach the restrictor opening, there is no further increasing closure of the opening. Since there is no increasing closure of restrictor opening 84, diaphragm 56 would not sense any changing pressure at the surface of the diaphragm and the diaphragm would cease to deflect.

By placement of O-ring 100 at a position adjacent the radially outboard end of the bevelled transition surface 115 as illustrated in FIGS. 1, 7, 16, 17 and 18, the O-ring provides continued and increasing closure of the restrictive opening as the intermediate portions of the bevelled surface approaches and moves into the restrictive opening. In this manner, the pressure at the surface of diaphragm 56 will continue to change and the diaphragm and poppet unit 50 will to move to effectively close restrictor opening 84.

Thus, O-ring 100 functions as a continuing closure element to provide continued and increasing closure of restrictive opening 84 in conjunction with the movement of bevelled surface 115 into the opening. Further, O-ring 100 functions as a full closure element in closing restrictor opening 84 and also functions as an anti-chattering element of pressure balancer 38.

In similar fashion, O-ring 102 functions as a continuing closure element to provide continued and increasing closure of restrictive opening 86 in conjunction with the movement of bevelled surface 117 into the opening. Further, O-ring 102 functions as a full closure element in closing restrictor opening 86 and also functions as an anti-chattering element of pressure balancer 38.

Currently, poppet units are typically composed of several elements which are assembled to form the poppet unit. Each element is manufactured with tolerances for the various parameters of the element. When the elements are assembled to form the poppet unit, the tolerances of the elements are cumulative. Under this process of making and assembling the elements, one poppet unit may have an overall length greater than that of another poppet unit where the elements of both poppet units are manufactured by the same facility. Thus, there is no consistency in the length and other parameters of poppet units which are composed of separate elements, even where the elements are manufactured by the same machinery and process.

When such multi-element poppet units are used in pressure balancers, the varying tolerances of poppet units of different balancers affect the performance of the associated balancers to the extent that consistent performance amongst balancers manufactured by the same process and machinery may not be attainable.

Poppet unit 50, as shown in FIG. 6, is manufactured from a single piece of material by use of a forming tool having a cutting profile which is a mirror image of the profile of the poppet unit. By manufacturing poppet unit 50 from a single piece of material, the tolerances of the unit can be closely controlled to the extent that each poppet unit will be formed with essentially the same parameters. In addition, there will be no cumulative tolerance effect as in the multi-element poppet unit because the single-piece poppet unit is being made in a single forming operation with a single set of tolerances. Single-piece poppet unit 50 provides consistency amongst units manufactured by the same process and machinery and thereby provides consistency to the operation of the pressure balancers in which the poppet units are assembled. Further, each single-piece poppet unit 50 is machined to match the parameters of adjacent components of the respective pressure balancer and to perform effectively and efficiently within the respective pressure balancer.

In general, the above-identified embodiments are not to be construed as limiting the breadth of the present invention. Modifications, and other alternative constructions, will be apparent which are within the spirit and scope of the invention as defined in the appended claims.

What is claimed is:

1. A valve assembly having a pressure balancer, which comprises:

a housing formed with a chamber;

a poppet unit composed of a rigid material and mounted for movement within the chamber;

a diaphragm mounted on the poppet unit and separating the chamber into a first compartment and a second compartment which define a first fluid flow path and a second fluid flow path, respectively;

at least a portion of the poppet unit being located in the first compartment of the chamber;

a closure surface located in the first compartment adjacent the first fluid flow path; and a compliant element mounted on and confined compliantly to the portion of the poppet unit for incremental movement therewith, the compliant element being aligned with and normally spaced from the closure surface and moved with the poppet unit to compliantly engage the closure surface and thereby seal the first fluid flow path upon movement of the diaphragm in a prescribed direction.

2. The valve assembly of claim 1 wherein the compliant element is a first compliant element and which further comprises:

a closure surface located in the second compartment adjacent the second fluid flow path; and a second compliant element mounted on another portion of the poppet unit in the second compartment for movement with the poppet unit, the second compliant element being aligned with and normally spaced from the closure located in the second compartment and moved with the poppet unit to compliantly engage the closure surface in the second compartment and thereby seal the second fluid flow path upon movement of the diaphragm in a direction opposite the prescribed direction.

3. The valve assembly of claim 1 wherein the compliant element is an O-ring composed of rubber.

4. A valve assembly having a pressure balancer, which comprises:

a housing formed with a chamber and at least one fluid flow path;

a poppet unit mounted for movement within the chamber and including at least one poppet and a support plate integrally formed therewith;

the poppet unit with the poppet and the support plate all formed integrally from and as a single piece of material;

a pressure responsive element mounted on the poppet unit in supported engagement with the support plate for movement therewith;

a closure surface located adjacent the fluid flow path; and an element mounted on the poppet for incremental movement therewith, the element being aligned with and normally spaced from the closure surface and moved with the poppet to engage the closure surface and thereby seal the fluid flow path upon movement of the pressure responsive element in a prescribed direction.

5. A valve assembly having a pressure balancer, which comprises:

a housing formed with a chamber;

a poppet unit mounted for movement within the chamber and including a first poppet at one end of the poppet unit and a second poppet at an opposite end of the poppet unit and a support plate integrally formed therewith;

the poppet unit with the first poppet, the second poppet and the support plate all formed integrally from and as a single piece of material;

a diaphragm mounted on the poppet unit between the first and second poppets and in supported engagement with the support plate and separating the chamber into a first compartment and a second compartment which define a first fluid flow path and a second fluid flow path, respectively;

the first poppet being located in the first compartment of the chamber;

the second poppet being located in the second compartment of the chamber;

a first closure surface located in the first compartment adjacent the first fluid flow path;

a second closure surface located in the first compartment adjacent the first fluid flow path;

a first element mounted on the first poppet for incremental movement therewith, the first element being aligned with and normally spaced from the first closure surface and moved with the first poppet to engage the first closure surface and thereby seal the first fluid flow path upon movement of the diaphragm in a prescribed direction; and a second element mounted on the second poppet for incremental movement therewith, the second element being aligned with and normally spaced from the second closure surface and moved with the second poppet to engage the second closure surface and thereby seal the second fluid flow path upon movement of the diaphragm in a direction opposite the prescribed direction.

6. A valve assembly having a pressure balancer, which comprises:

a housing formed with a chamber;

a poppet unit having a longitudinal axis mounted for movement within the chamber;

a fluid flow path formed in the housing and in communication with the chamber;

the fluid flow path formed with an opening of a prescribed size;

the poppet unit being of a size smaller than the prescribed size;

the poppet unit being formed with a surface which is normally positioned adjacent the opening and which is configured such that as successive portions of the surface are moved into the opening at least partial closure of the opening is successively attained;

an element mounted on the poppet unit with the surface being located normally between the opening and the element;

the element extending radially outward from the axis of the poppet unit a distance sufficient to form a combined poppet unit and element structure having a size greater than the prescribed size which precludes entry of the element in the opening of the fluid flow path; and a pressure responsive device for moving the poppet unit in response to changes in pressure of fluid in the chamber so that the surface is moved into the opening to initiate closure of the opening and the element is eventually positioned to finally close the opening.

7. The valve assembly of claim 6, which further comprises the poppet unit being formed from a single piece of material.

8. A valve assembly having a pressure balancer, which comprises:

a housing formed with a chamber;

a poppet unit mounted for movement within the chamber;

the poppet unit formed with a hub of a first diameter, a poppet spaced axially from the hub and of a second diameter greater than the first diameter and a transition surface extending between the hub and the poppet;

a fluid flow path formed in the housing and in communication with the chamber;

the fluid flow path formed with an opening of a diameter greater than the first diameter;

at least portions of the hub being located normally in the opening;

the transition surface being normally adjacent and spaced from the opening;

an element mounted on the poppet adjacent a juncture of the transition surface and the poppet; and a pressure responsive device for moving the poppet unit in response to changes in pressure of fluid in the chamber so that the transition surface is moved into the opening to initiate closure of the opening and the element, if required, is eventually positioned to finally close the opening.

9. The valve assembly of claim 8 wherein the element is a compliant element which compresses about the opening to seal the opening.

10. The valve assembly of claim 9 which further comprises the opening being formed with a poppet-assembly side and sealing side wherein a rim of the opening on the poppet-assembly side is rounded to facilitate passage of the compliant element during assembly of the poppet unit with the housing and a rim of the opening on the sealing side is sharp cornered to preclude passage of the compliant element through the opening when the compliant element is moved to seal the opening.

11. The valve assembly of claim 8 wherein the transition surface is a linear bevelled surface extending between the small diameter of the hub and the larger diameter of the poppet.

12. The valve assembly of claim 8 wherein the transition surface and the poppet are a first transition surface and a first poppet extending from one end of the hub, the fluid flow path is a first fluid flow path, the opening is a first opening and the element is a first element, which further comprises:

a second poppet of the second diameter and a second transition surface extending from an end of the hub opposite the one end;

a second fluid flow path formed in the housing in communication with the chamber and formed with a second opening of a diameter greater than the first diameter;

a second element mounted on the second poppet adjacent a juncture of the second transition and the second poppet; and the pressure responsive device for moving the poppet unit in response to changes in pressure of fluid in the chamber so that the second transition surface is moved into the opening to initiate closure of the opening and the second element, if required, is eventually positioned to finally close the opening.

13. The valve assembly of claim 8 wherein the opening of the fluid flow path is formed so that all oppositely facing wall portions thereof have a dimension greater than the second diameter.

14. A valve assembly having a pressure balancer, which comprises:

a housing formed with a chamber;

a poppet unit mounted for movement within the chamber;

a poppet formed with the poppet unit;

a well formed in the housing with an inboard end for receipt of a first portion of the poppet which is assembled for movement within and relative to the well;

the first portion of the poppet formed with an end in spaced interfacing relation with the inboard end of the well;

a compliant element mounted on a second portion of the poppet unit externally of the well and movable therewith in a direction toward the inboard end of the well;

a stop formed in the housing in the path of the element; and the distance between the inboard end of the well and the stop being greater than the distance between the end of the first portion of the poppet unit and the element.

15. A valve assembly having a pressure balancer, which comprises:

a housing formed with a chamber;

a poppet unit mounted for movement within the chamber;

a first poppet formed at one end of the poppet unit and a second poppet formed at an end of the poppet unit opposite the one end;

the first poppet formed with an end coincidental with one end of the poppet unit and the second poppet formed with an end coincidental with another end of the poppet unit opposite the one end;

a first well formed in the housing for receipt of a first portion of the first poppet for relative movement therein and having an inboard end;

a second well formed in the housing for receipt of a first portion of the second poppet for relative movement therein and having an inboard end;

a first compliant element mounted on a second portion of the first poppet externally of the first well for movement therewith and positioned for engagement with a first stop surface formed by the housing;

a second compliant element mounted on a second portion of the second poppet externally of the second well for movement therewith and positioned for engagement with a second stop surface formed by the housing; and the distance between the inboard end of the first well and the second stop surface being greater than the distance between the end of the first poppet and the second element whereby the second element engages the second stop surface to preclude engagement of the end of the first poppet with the inboard end of the first well.

16. A valve assembly having a pressure balancer, which comprises:

a housing formed with a chamber;

a poppet unit mounted for movement within the chamber;

a first poppet formed at one end of the poppet unit and a second poppet formed at an end of the poppet unit opposite the one end;

the first poppet formed with an end coincidental with one end of the poppet unit and the second poppet formed with an end coincidental with another end of the poppet unit opposite the one end;

a first well formed in the housing for receipt of the first poppet for relative movement therein and having an inboard end;

a second well formed in the housing for receipt of the second poppet for relative movement therein and having an inboard end;

a first compliant element mounted on the first poppet for movement therewith and positioned for engagement with a first stop surface formed by the housing;

a second compliant element mounted on the second poppet for movement therewith and positioned for engagement with a second stop surface formed by the housing;

the distance between the inboard end of the first well and the second stop surface being greater than the distance between the end of the first poppet and the second element whereby the second element engages the second stop surface to preclude engagement of the end of the first poppet with the inboard end of the first well; and wherein the first and second stop surfaces are formed by surfaces of the housing adjacent fluid passage openings in the housing which are sealed by the compliant elements as the elements engage the stop surfaces.

17. The valve assembly of claim 1, which further comprises:

a poppet formed with the poppet unit;

a well formed in the housing for receipt of the poppet which is assembled for movement relative to the well;

the well formed with an inboard end;

the poppet formed with an end in spaced interfacing relation with the inboard end of the well;

a fluid flow path formed in the housing in communication with the chamber; and a flow passage formed internally through the poppet in communication with the fluid flow path and a space in the well defined by the inboard end of the well and the poppet end.

18. A valve assembly having a pressure balancer, which comprises:

a housing formed with a chamber;

a poppet unit mounted for movement within the chamber;

a diaphragm mounted on the poppet unit and separating the chamber into a first compartment and a second compartment which define a first fluid flow path and a second fluid flow path, respectively;

at least a portion of the poppet unit being located in the first compartment of the chamber;

a closure surface located in the first compartment adjacent the first fluid flow path;

a compliant element mounted on the first portion of the poppet unit for movement therewith, the compliant element being aligned with and normally spaced from the closure surface and moved with the poppet unit to compliantly engage the closure surface and thereby seal the first fluid flow path upon movement of the diaphragm in a prescribed direction;

a mixing chamber formed in the housing for receiving fluid from the first and second fluid flow paths;

a base interposed between the fluid flow paths and the mixing chamber;

a plate for assembly with the base;

at least one tab formed on the plate;

at least one receptacle formed on the base for receipt of the tab of the plate; and the receptacle being formed with resilient structure for biasingly holding the tab and to allow relaxation of the biased holding of the tab to permit extraction of the tab from the receptacle.

19. The valve assembly of claim 18 wherein the receptacle includes a pair of spaced arms which are separated by a space sufficient to allow the arms to be urged normally toward each other without touching.

20. The valve assembly of claim 18 wherein the receptacle includes:

a first "L" shaped arm formed on and extending from the base;

a second "L" shaped arm formed on and extending from the base;

the first and second "L" shaped arms having a first leg extending generally perpendicular from the base and spaced from each other;

the first and second "L" shaped arms having a second leg extending perpendicularly from an outboard end of its first leg with each of the second legs facing toward each other but with a space being formed between spaced free ends thereof; and the first and second "L" shaped arms forming the receptacle for receipt of the tab therein.

21. The valve assembly of claim 20 wherein the enclosure is formed with side walls which are tapered.

22. The valve assembly of claim 21 wherein the tab is formed with tapered side edges which are received by the tapered side walls of the receptacle.

23. The valve assembly of claim 22 wherein the tab is formed with at least one edge which engages the adjacent side wall of the receptacle to provide facility for retaining the tab within the receptacle.

24. A valve assembly having a pressure balancer, which comprises:

a housing formed with a chamber;

a poppet unit mounted for movement within the chamber;

a diaphragm mounted on the poppet unit and separating the chamber into a first compartment and a second compartment which define a first fluid flow path and a second fluid flow path, respectively;

at least a portion of the poppet unit being located in the first compartment of the chamber;

a closure surface located in the first compartment adjacent the first fluid flow path;

a compliant element mounted on the first portion of the poppet unit for movement therewith, the compliant element being aligned with and normally spaced from the closure surface and moved with the poppet unit to compliantly engage the closure surface and thereby seal the first fluid flow path upon movement of the diaphragm in a prescribed direction;

a mixing chamber formed in the housing and in communication with the first and second fluid flow paths for directing fluids from the fluid flow paths to the mixing chamber;

a control element for controlling the volume of fluid allowed to enter the mixing chamber;

at least a pair of grooves formed on the control element; and a rib formed transversely in one of the grooves.

* * * * *

UNITED STATES PATENT AND TRADEMARK OFFICE
CERTIFICATE OF CORRECTION

PATENT NO. : 5,501,244
DATED : March 26, 1996
INVENTOR(S) : Shahriar Niakan

It is certified that error appears in the above-identified patent and that said Letters Patent is hereby corrected as shown below:

On title page, item [75] should read as follows:

(75) Inventor: Shahriar Niakan

Signed and Sealed this

Eighteenth Day of June, 1996

Attest:

BRUCE LEHMAN

*Attesting Officer*    *Commissioner of Patents and Trademarks*